United States Patent [19]

Ritsko et al.

[11] Patent Number: 4,537,750

[45] Date of Patent: Aug. 27, 1985

[54] PROCESS FOR PRODUCING HIGH PURITY TANTALUM OXIDE

[75] Inventors: Joseph E. Ritsko; Howard L. Acla, both of Towanda, Pa.

[73] Assignee: GTE Products Corporation, Stamford, Conn.

[21] Appl. No.: 584,848

[22] Filed: Feb. 29, 1984

[51] Int. Cl.$^3$ .............................................. C01G 35/00
[52] U.S. Cl. ........................................ 423/65; 423/62; 423/68
[58] Field of Search .............. 423/62, 65, 68; 75/121

[56] References Cited

U.S. PATENT DOCUMENTS

| | | | |
|---|---|---|---|
| 1,802,242 | 4/1931 | Fink et al. | 423/68 |
| 3,099,526 | 7/1963 | Li et al. | 423/68 |
| 4,302,243 | 11/1981 | Tamaru et al. | 423/68 |

FOREIGN PATENT DOCUMENTS

| | | | |
|---|---|---|---|
| 866716 | 4/1961 | United Kingdom | 423/65 |
| 956614 | 4/1964 | United Kingdom | 423/62 |

*Primary Examiner*—H. T. Carter
*Attorney, Agent, or Firm*—Robert E. Walter

[57] ABSTRACT

A process is disclosed for producing high purity tantalum oxide from impure tantalum oxide. The starting tantalum oxide is dissolved in a hydrofluoric acid solution and insolubles are removed. The hydrofluoric acid solution containing the tantalum values is adjusted to a pH of from about 6.0 to about 8.0 with a base to precipitate tantalum which is separated from the mother liquor. The tantalum precipitate is then dissolved in an oxalic acid solution, the pH adjusted to from about 5.1 to about 5.5, and the resulting solution digested to precipitate a high purity tantalum compound which is separated. The high purity tantalum compound is then digested in hydrochloric acid to dissolve the compound and then precipitate pure optical grade tantalum oxide which is then separated from its mother liquor.

10 Claims, No Drawings

PROCESS FOR PRODUCING HIGH PURITY TANTALUM OXIDE

BACKGROUND OF THE INVENTION

This invention relates to the preparation of optical grade tantalum oxide which is of high purity.

High purity tantalum and/or niobium compounds can be produced by ion exchange or solvent extraction processes. Said ion exchange or solvent extraction processes require large outlays of equipment and raw materials. Such methods are described in the following U.S. Pat. No. 3,107,976, 2,895,793, 2,880,060, 2,819,945, 4,182,744, 4,069,268, 4,065,405, 3,972,710.

SUMMARY OF THE INVENTION

It is an object of this invention to provide a process for producing high purity tantalum oxide from impure tantalum oxide. It is a further object of this invention to provide a process for producing optical grade tantalum oxide from standard grade material.

The starting impure tantalum oxide is contacted with an aqueous solution of hydrofluoric acid of sufficient strength to solubilize it. The insolubles, if any, are then separated from the aqueous solution of hydrofluoric acid containing the tantalum values. The hydrofluoric acid solution containing the tantalum values is then adjusted to a pH of from about 6.0 to about 8.0 with a base to precipitate the tantalum, which is then separated from the mother liquor. The tantalum precipitate is then contacted with an oxalic acid solution of sufficient strength to dissolve it. The pH of the resulting oxalic acid solution containing the tantalum values is then adjusted to from about 5.1 to about 5.5 and the resulting solution digested at above above about 80° C. for a sufficient time to produce a high purity compound of tantalum, which is then separated from the oxalate mother liquor. The high purity compound of tantalum is then digested in an aqueous solution of hydrochloric acid having a strength of from about 5% to about 15%, at a sufficient temperature and time to dissolve the high purity compound of tantalum in the hydrochloric acid and to precipitate pure optical grade tantalum oxide. The optical grade tantalum oxide is then separated from the hydrochloric acid mother liquor.

DETAILED DESCRIPTION OF THE INVENTION

For a better understanding of the present invention, together with other and further objects, advantages, and capabilities thereof, reference is made to the following disclosure and appended claims.

The starting material can be any tantalum oxide. Generally tantalum oxide of standard grade is used.

The starting material is contacted with an aqueous solution of hydrofluoric acid of sufficient strength to solubilize the tantalum values. Any strength of hydrofluoric acid can be used to accomplish the solubilization of the tantalum values. Generally from about 12N to about 40N is used with from 25N to about 30N being preferred. Any residual solids are then removed from the resulting hydrofluoric acid solution by any standard technique such as filtration. The pH of the hydrofluoric acid solution containing said tantalum values is then adjusted to from about 6.0 to about 8.0 with from about 7.5 to about 8.0 being preferred, with a base preferably ammonium hydroxide to precipitate the tantalum. The tantalum precipitate is then separated from the resulting hydrofluoric acid mother liquor by any standard technique such as filtration. The tantalum precipitate is then contacted with an oxalic acid solution of sufficient strength to dissolve the tantalum precipitate. Generally from about 0.5N to about 2N being preferred. The pH of the oxalic acid solution is then adjusted to from about 5.1 to about 5.5 with a base preferably ammonium hydroxide or tantalum dioxyfluoride. The resulting oxalate solution containing the tantalum values is then digested at above about 80° C. for a sufficient time to produce a high purity compound of tantalum. Generally temperatures are from about 60° C. to about 100° C. with from about 75° C. to about 85° C. being preferred. Generally digestion times are from about 2 hours to about 6 hours with from about 3 hours to about 4 hours being preferred. The high purity compound of tantalum is then separated from the oxalate mother liquor by any standard technique such as filtration. The high purity compound of tantalum is then digested in hydrochloric acid of from about 1N to about 10N, at a sufficient temperature and for a sufficient time to dissolve the high purity compound of tantalum and to subsequently precipitate pure optical grade tantalum oxide. Generally digestion temperatures are from about 60° C. to about 100° C. with from about 70° C. to about 85° C. being preferred. Generally digestion times are from about 2 hours to about 6 hours, with from about 3 hours to about 4 hours being preferred. The pure optical grade tantalum oxide precipitate is then separated from the hydrochloric acid mother liquor by any standard technique such as filtration. The optical grade tantalum oxide can then be heated at a sufficient temperature to remove any water. Generally heating temperatures are from about 900° C. to about 1000° C. A very high purity tantalum oxide results.

EXAMPLE

The starting material is tantalum oxide of standard grade. The starting material is contacted with an aqueous solution of hydrofluoric acid at about 25N after digesting. Residual solids are removed from the resulting hydrofluoric acid solution by filtration. The pH of the hydrofluoric acid solution containing said tantalum values is then adjusted to about 7 with an ammonium hydroxide to precipitate the tantalum. The tantalum precipitate is then separated from the resulting hydrofluoric acid mother liquor by filtration. The tantalum precipitate is then contacted a 0.3N oxalic acid solution to dissolve the tantalum precipitate. The pH of the oxalic acid solution is then adjusted to 5.4 with tantalum dioxyfluoride. The resulting oxalate solution containing the tantalum values is then digested at about 90° C. to produce a high purity compound of tantalum. The high purity compound of tantalum is then separated from the oxalate mother liquor by filtration and then digested in hydrochloric acid at 6N to dissolve the high purity compound of tantalum and to subsequently precipitate pure optical grade tantalum oxide. Digestion temperature is about 80° C. Digestion time is about 3 hours. The pure optical grade tantalum oxide precipitate is then separated from the hydrochloric acid mother liquor by as filtration. The optical grade tantalum oxide is heated at 950° C. A high purity tantalum oxide results.

What is claimed is:

1. A process for producing optical grade tantalum oxide from an impure tantalum oxide, said process comprising:

(a) contacting said impure tantalum oxide with an aqueous solution of hydrofluoric acid of sufficient strength to solubilize said impure tantalum oxide, (b) separating said aqueous solution of hydrofluoric acid containing the tantalum values from any insolubles, (c) adjusting the pH of said aqueous solution of hydrofluoric acid containing said tantalum values to from about 6.0 to about 8.0 with a base to precipitate the tantalum values, (d) separating the precipitate of tantalum values from the pH adjusted aqueous hydrofluoric acid mother liquor, (e) contacting said precipitate of tantalum with an oxalic acid solution of sufficient strength to dissolve said precipitate of tantalum, (f) adjusting the pH of the oxalic acid solution containing the tantalum values to from about 5.1 to about 5.5, (g) digesting the resulting oxalate solution containing the tantalum values at above about 80° C. for a sufficient time to produce a high purity compound of tantalum, (h) separating said high purity compound of tantalum from the oxalate solution mother liquor and, (i) digesting said high purity compound of tantalum in an aqueous solution of hydrochloric acid having a strength of from about 1N to about 10N, at a sufficient temperature and for a sufficient time to dissolve said high purity compound of tantalum in said aqueous solution of hydrochloric acid and continuing digesting for a sufficient time to subsequently precipitate pure optical grade tantalum oxide and, (j) separating said precipitate from the hydrochloric acid mother liquor.

2. A process according to claim 1 wherein said impure tantalum oxide is contacted with an aqueous solution of hydrofluoric acid of from about 12N to about 40N.

3. A process according to claim 1 wherein the pH of said aqueous solution of hydrofluoric acid is adjusted with ammonium hydroxide.

4. A process according to claim 1 wherein said oxalic acid solution is from about 0.5N to about 2.0N.

5. A process according to claim 1 wherein the pH of said oxalic acid solution is adjusted with a compound selected from the group consisting of ammonium hydroxide and tantalum dioxyfluoride.

6. A process according to claim 1 wherein said resulting oxalate solution containing the tantalum values is digested at from about 70° C. to about 90° C.

7. A process according to claim 6 wherein the digestion time is from about 2 hours to about 6 hours.

8. A process according to claim 1 wherein said high purity compound of tantalum is digested at a temperature of from about 75° C. to about 90° C.

9. A process according to claim 8 wherein the digestion time is from about 2 hours to about 6 hours.

10. A process according to claim 1 wherein said optical grade tantalum oxide precipitate is heated at from about 900° C. to about 1000° C.

* * * * *